United States Patent [19]

Yoshimura et al.

[11] Patent Number: 5,710,764
[45] Date of Patent: Jan. 20, 1998

[54] METHOD OF SIGNAL TRANSMISSION IN A MOBILE COMMUNICATION SYSTEM

[75] Inventors: Yukio Yoshimura; Tetsuya Yamashita, both of Tokyo, Japan

[73] Assignee: NEC Corporation, Tokyo, Japan

[21] Appl. No.: 653,698

[22] Filed: May 23, 1996

[30] Foreign Application Priority Data

May 26, 1995 [JP] Japan .................. 7-128403

[51] Int. Cl.$^6$ ........................................ H04J 3/14
[52] U.S. Cl. .................. 370/315; 370/336; 370/459; 455/11.1; 455/16
[58] Field of Search .................. 370/316, 319, 370/321, 326, 327, 501, 293, 310, 312, 315, 328, 329, 330, 336, 345, 351, 357, 360, 375, 384, 428, 436, 458, 478, 498, 522, 459; 455/11.1, 12.1, 13.1, 15, 16, 17, 56.1, 53.1, 54.1, 54.2; 375/211, 212; 379/56, 57, 58, 59, 61, 63

[56] References Cited

U.S. PATENT DOCUMENTS

| | | | |
|---|---|---|---|
| 2,627,021 | 1/1953 | Hansell et al. | 455/11.1 |
| 2,748,266 | 5/1956 | Boyd | 455/11.1 |
| 3,745,462 | 7/1973 | Trimble | 455/11.1 |
| 3,955,140 | 5/1976 | Stephens et al. | 455/11.1 |
| 4,713,809 | 12/1987 | Mizota | 370/315 |
| 5,152,002 | 9/1992 | Leslie et al. | 455/16 |
| 5,179,720 | 1/1993 | Grube et al. | 455/16 |
| 5,276,686 | 1/1994 | Ito | 455/33.1 |
| 5,412,654 | 5/1995 | Perkins | 455/11.1 |
| 5,530,909 | 6/1996 | Simon et al. | 455/11.1 |
| 5,548,803 | 8/1996 | Evans | 455/17 |

OTHER PUBLICATIONS

Sleeper, "Possibilities of Stratovision," FM & Television, pp. 15–17 and 45, Aug. 1948.
Dodrill et al., "Using Radio Links and Relays," Communication Engineering, vol. 14 #1, Feb. 1954.

Primary Examiner—Wellington Chin
Assistant Examiner—Huy D. Vu
Attorney, Agent, or Firm—Young & Thompson

[57] ABSTRACT

A method of signal transmission between radio base stations (BSs) in a mobile communication system by using only one transmission system commonly used for both of communication with the exchange and communication with mobile stations (MSs) is realized. Each BS has at least one each of receiver and transmitter operable in the same frequency used in an adjacent BS, a call signal to be transferred is assigned in a channel slot of same radio signal as used for communication with MSs in own radio zone, the call signal contains destination indicator indicating an identification number of the BS to which the call signal is to be transferred, and each BS compares the indicator with own identification number, and if they coincide with each other, the call signal is extracted and used in the BS, but if they do not coincide with each other, the call signal is relayed to the next BS by transmitting radio signal containing the call signal in the same channel slot as received.

2 Claims, 5 Drawing Sheets

METHOD OF SIGNAL TRANSMISSION IN A MOBILE COMMUNICATION SYSTEM

BACKGROUND OF THE INVENTION

1. Field of the Invention

The present invention relates to a method of signal transmission in a mobile communication system, and, more particularly, to a method of signal transmission between a calling party and a called party in a mobile communication system which includes a plurality of mobile stations, radio base stations each providing a radio zone inherent thereto which communicates with the plurality of mobile stations in accordance with any of multiplexing transmission systems of a time division multiplex system, a frequency division multiplex system and a spread spectrum multiplex system, and an exchange for managing mobile communication calls and controlling the entire communication system.

2. Description of the Related Art

In a conventional mobile communication system, when a call is originated in a public switched telephone network (PSTN) and a destination of the call is to a mobile station, signal transmission path is established from the PSTN, the exchange, one of radio base stations and the mobile station to be called, and the signal transmission path employs two kind of transmission systems. One is the transmission system, such as a PCM system, from the exchange, which is connected to the PSTN, to radio base stations for sending and receiving call signals between the exchange and the radio base stations, and another is the transmission system for radio communication between a radio base station and mobile stations existing in the radio zone provided by the radio base station.

Therefore, each radio base station requires those two kind transmission systems in one site for communicating with mobile stations on one side and communicating with the exchange on the other side. If the transmission system between the exchange and the radio base station is a type of radio (wireless) transmission system, a frequency difference should be secured between with respect to the radio transmission system each other.

Further, in the conventional mobile communication system, all calls processed by the mobile communication system should establish a communication path through the exchange between a calling party and a called party at any time even if both the provided by adjacent radio base stations.

As described above, in the conventional mobile communication system, there occur such problems that:

(1) a large amount of investment for system facilities is required, because two kind of transmission systems are to be provided in each radio base station and all calls should pass through an exchange; and (2) a system design of frequency assignment for each transmission system in a single radio base station is needed.

Those problems appears especially in the mobile communication system whose service area is a low traffic area and the service area is not distributed widely, but rather along a line (e.g. service area is provided along a rural highway).

SUMMARY OF THE INVENTION

Therefore, an object of the present invention is to provide a method of signal transmission between radio base stations in a mobile communication system, with which the facility cost and the operational cost required for operating the mobile communication system is minimized by using only one transmission system for both communication with the exchange and communication with mobile stations.

A method of signal transmission in a mobile communication system, including a plurality of mobile stations, a plurality of radio base stations each providing a radio zone inherent thereto which communicates with the plurality of mobile stations in accordance with a multiplexing transmission system and each having at least one receiver and one transmitter operable in a radio frequency used in an adjacent radio base station, and an exchange managing mobile communication calls and controlling the mobile communication system, the method comprises the following steps:

1. in the exchange;
    (1) discriminating a target radio base station and a mobile station by which a call is to be received when accepting a call request from a public switched telephone network at the exchange;
    (2) determining radio base stations to be used for a signal transmission path between the exchange and the target radio base station, and selecting a channel slot of radio signal which is available in all determined radio base stations including the target radio base station;
    (3) instructing each of all the transmission path radio base stations to store information of the selected channel slot of radio signal;
    (4) connecting speech path between the public switched telephone network and the nearest radio base station among the selected radio base stations; and
    (5) transferring a call signal which is contained in the selected channel slot; and
2. in each radio base station;
    (1) monitoring channel slots of radio signal transmitted on a radio frequency of adjacent radio base station in accordance with the stored channel slot information; and
    (2) extracting and repeating transmission of the call signals in the channel slots with the radio base stations own radio frequency in the same channel slots as those of received radio signal.

A method of signal transmission in a mobile communication system according to the present invention also comprises the following steps:

1. in the exchange;
    (1) determining an originating radio base station from which a call request is originated, and a target radio base station and a mobile station by which the call is to be received;
    (2) determining radio base stations to be used for a signal transmission path between the originating radio base station and the target radio base station, and selecting a channel slot of radio signal which is available in all determined radio base stations including the target radio base station; and
    (3) instructing each of all the transmission path radio base stations to store information of selected channel slot of radio signal
2. in the originating radio base station;
    (1) transmitting a call signal transferred from the mobile station in the originating radio base station radio zone putting in the channel slot instructed by the exchange with a radio frequency used by the adjacent radio base station; and
3. in each of other radio base stations;

(1) monitoring radio signal transmitted by a radio frequency of adjacent radio base station, and also monitoring radio signal transmitted on a radio frequency of own radio base station, in accordance with the stored channel slot information; and (2) extracting and repeating transmission of the call signals in the channel slots with own radio frequency in the same channel slots as those its of received radio signal.

DETAILED DESCRIPTION OF THE PREFERRED EMBODIMENTS

The present invention will be described in the following by referring to the attached drawings. In the following description, the time division multiplex transmission system is assumed as an example of multiplexing system.

Figure 1:
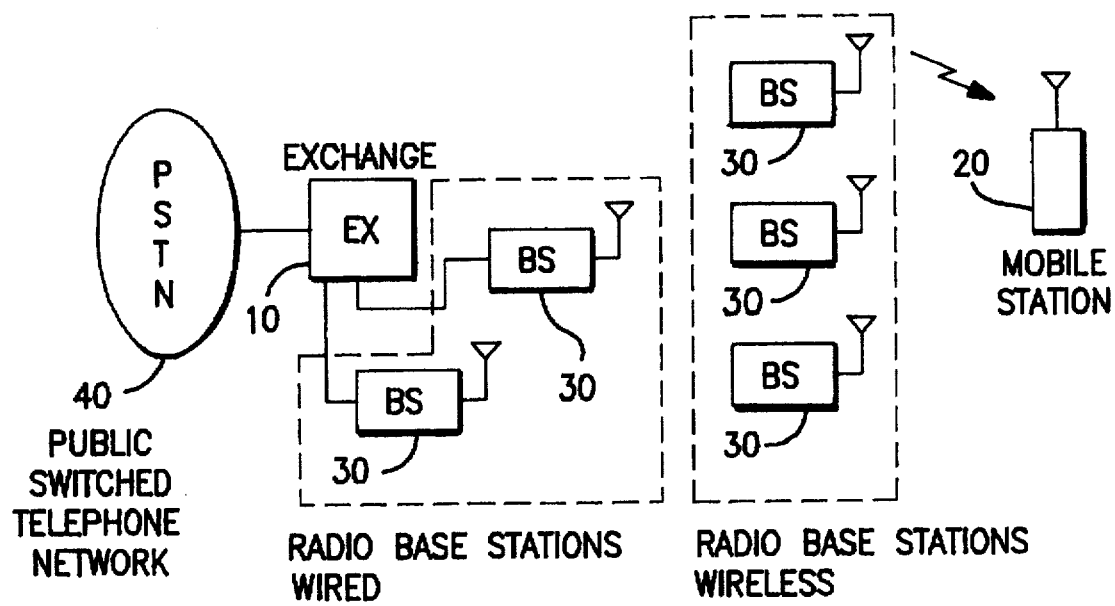
FIG. 1 is a block diagram showing an entire mobile communication system of an embodiment according to the present invention.

FIG. 1 is a block diagram showing an entire mobile communication system according to one embodiment of the present invention. This mobile communication system is constituted by an exchange 10 connected to the PSTN 40 and controlling and integrating the entire system, a plurality of mobile stations (only one mobile station 20 is shown in FIG. 1), and a plurality of radio base stations 30 each of which provides a radio zone inherent thereto and communicates with mobile stations by using radio channels assigned for each mobile station respectively.

As shown in FIG. 1, there are two types of radio base stations.

One type is the conventional type of radio base station provided with a transmission system connect, the radio base station to the exchange 10, which is independent of a radio transmission system for communicating with mobile stations. This type of radio base stations are encircled by a dotted line and designated "RADIO BASE STATION WIRED" in FIG. 1, and are mainly used for providing service in a widely distributed area, such as a city area.

Another type is the radio base station adopting the present invention, in which the radio transmission system for communicating with mobile stations same as that used for the transmission system connecting the radio base station to the exchange 10 as well as that and connecting to adjacent radio base station. This type of radio base stations are encircled by dotted line and designated "RADIO BASE STATION WIRELESS" in FIG. 1, and are mainly used for providing service in an area spread along a rural highway.

Figure 2:
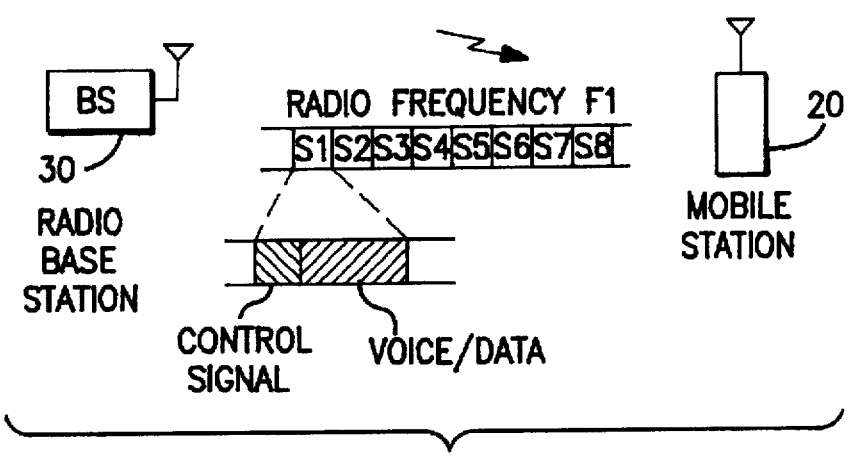
FIG. 2 is a diagram of a channel configuration adopting a TDMA system.

FIG. 2 is a conceptual view showing a channel configuration of a TDMA (Time Division Multiplex Access) system employed in communication between the mobile station 20 and the radio base station 30.

In the TDMA system, each radio frequency is divided (time-divided) into a predetermined number of time slots (i.e., S1 to S8), and each of the time slots S1 to S8 is assigned as a communication channel. Further, each channel slot consists of a predetermined number of information bits, and control signal and voice/data information (digitally modulated) are assigned in a predetermined bit/bits location. Furthermore, one channel slot is necessarily assigned as a control channel for transmitting control information, which is used for controlling the mobile station, the radio base station and the exchange, between the exchange and the radio base station, and between the radio base station and the mobile station.

Figure 3:
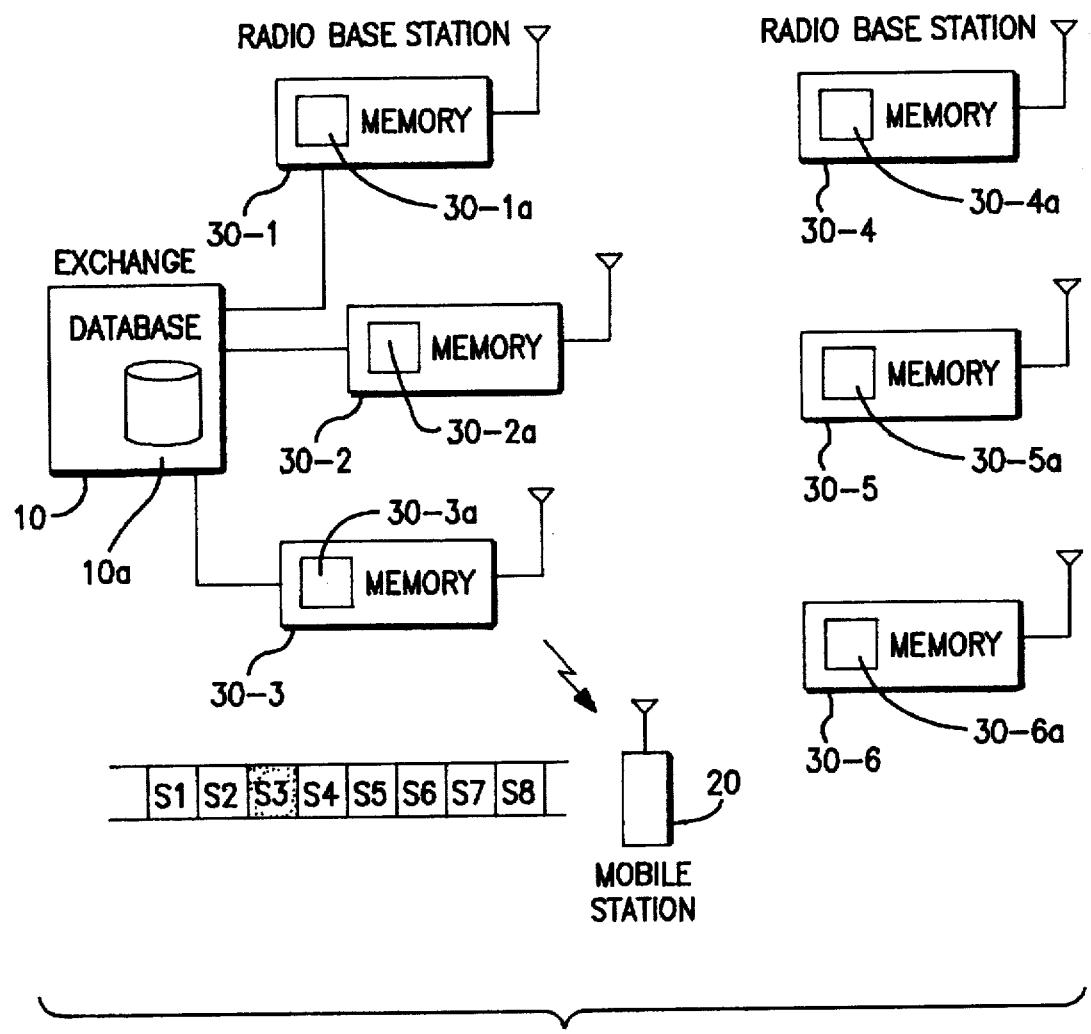
FIG. 3 is a block diagram of a equipment configuration concerning a technique for managing the status of use of each channel slot.

FIG. 3 illustrates an equipment configuration for managing the status of use of each channel slot in the mobile communication system.

The exchange 10 constantly supervises the busy/idle state of each channel slot and the traffic of the respective radio base stations 30-1 to 30-6 through the control channel.

When a call request is originated by a mobile station through a radio base station, the exchange 10 selects one idle channel slot among available channel slots corresponding to the radio base station for the call request, and instructs the radio base station to use the selected channel slot for the call request, and then the information is transferred to the mobile station from the radio base station for starting communication using the selected channel slot. At this time, the exchange 10 registers the selected channel slot as in a busy state in a database 10a of the exchange 10.

When a call is completed and disconnected, this information is transmitted from the radio base station concerned through the control channel, and the exchange 10 renews corresponding channel slot information in the database to idle state.

In like this manner, the exchange 10 indicates, through the control channel, a channel slot which can be used for communication with the mobile station 20 to the respective radio base stations 30-1 to 30-6 on the basis of the information registered in the database 10a, and each radio base station 30-1 to 30-6 records this information in memory 30-1a to 30-6a respectively.

Next, a method for assuring a signal transmission path for communication between the exchange 10 and the radio base station 30 or between multiple radio base stations 30 will be explained with reference to FIGS. 4, 5 and 6.

Figure 4:
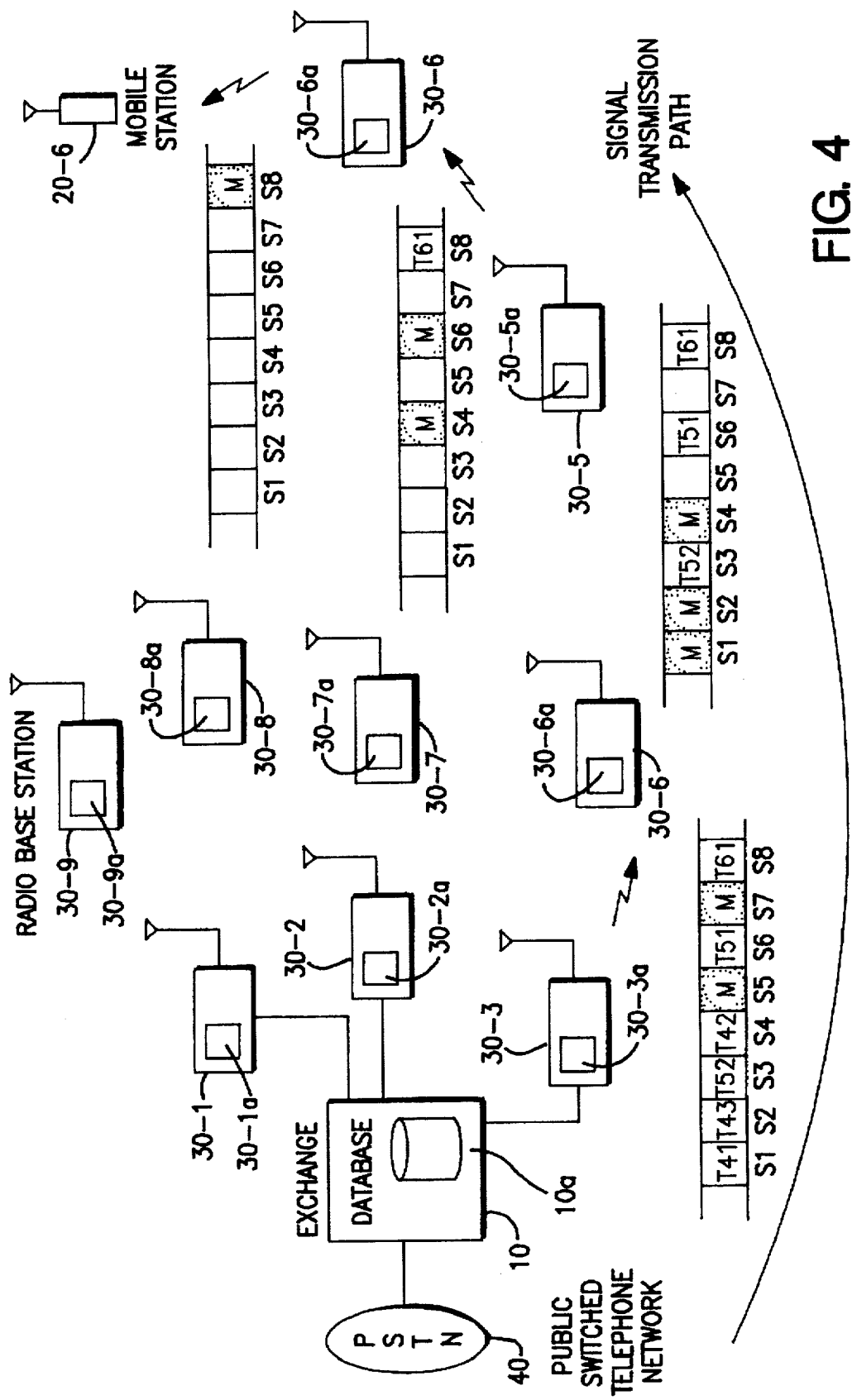
FIG. 4 is an illustration of a method for assuring a transmission path between an exchange and a radio base station in case of communication between a PSTN and a mobile station.

FIG. 4 shows a method for establishing a transmission path between the exchange 10 and radio base station by using the radio transmission system in the radio base station for communicating with mobile stations in case of communication between the PSTN 40 and mobile station.

The principles of the present invention are:

(1) base station has at least one each of receiver and transmitter operable in the same frequency used in adjacent radio base station;

(2) information to be transferred between radio base stations is assigned in channel slots of the same radio signal as that used for communication with mobile stations in a radio zone provided by the radio base station;

(3) each radio base station knows channel slots which are used for signal transfer by the instruction of the exchange through the control channel;

(4) each radio base station monitors channel slots instructed by the exchange for both the radio frequency used by the adjacent radio base station and the radio frequency it uses itself;

(5) a call signal contained in each channel slot being monitored is extracted and transmitted by the radio signal of its own radio frequency; and (6) If the call signal is to be received by a mobile station in its own radio zone, the call signal is received by the mobile station in a conventional manner. If the call signal is to be transferred to the next radio base station, the call signal is received by the next radio base station according to the present invention, and the same operation is repeated until the call signal is received by the mobile station which is supposed to receive the call signal.

These principles will be explained by referring to FIG. 4.

In FIG. 4, a signal transmission path is established between the PSTN and the mobile station 20-6 located in the radio zone provided by the radio base station 30-6 via the exchange 10, the radio base station 30-3, the radio base station 30-4, the radio base station 30-5 and the radio base station 30-6.

In each radio base station, channel slots are allocated not only for communication with mobile stations located in each radio zone, but also for signals to be transferred between radio base stations.

For example, allocation of channel slots of radio signal transmitted by the radio base station 30-3 is as follows:

(1) channels slot S1 is a signal to be transferred to the radio base station 30-4 for the first call;

(2) channels slot S2 is a signal to be transferred to the radio base station 30-4 for the third call;

(3) channels slot S3 is a signal to be transferred to the radio base station 30-5 for the second call;

(4) channels slot S4 is a signal to be transferred to the radio base station 30-4 for the second call;

(5) channels slot S5 is a signal for communication with a mobile station locating in own radio zone;

(6) channels slot S6 is a signal to be transferred to the radio base station 30-5 for the first call;

(7) channels slot S7 is a signal for communication with a mobile station located in its own radio zone; and (8) channels slot S8 is a signal to be transferred to the radio base station 30-6 for the first call;

Marks "M" and "T--" are just added for explanation purposes, and are not added in the actual radio signal. Each radio base station, however, knows which channel slots are to be used for signal transfer to other radio base station and which channel slots are to be used by communication with mobile stations in its own radio zone by the instructions of the exchange.

For example, any channel slot indicated by a mark of "M" designates a channel slot used by the corresponding base station for communicating with mobile stations located in its own radio zone, and the channel slot indicated by a mark of "T--" designates a channel slot to be used for signal transfer between radio base stations, with the first digit following the "T" representing a destination radio base station, and the last digit designating a sequential number of each call.

Therefore, when an attention is drawn on a channel slot transmitted from the radio base station 30-3 to the radio base station 30-6 through the radio base stations 30-4 and 30-5, the channel slots S1, S2 and S4 are represented as T41, T43 and T42 and these channel slots include call signals to be transferred to the radio base station 30-4, and call signals in those channel slots are extracted at the radio base station 30-4 to use the communication with mobile stations located in its own radio zone (the communication is carried out by using channel slot S1, S2 or S4 indicated by a mark of "M" in the radio base station 30-4). In like this manner, the channel slots S3 and S6 are used for call signal transfer to the radio base station 30-5, and the channel slot S8 is used for call signal transfer to the radio base station 30-6, and call signals in those channel slots are extracted only at the designated radio base station and relayed to other radio base stations.

Now, operation of communication between the PSTN and the mobile station 20-6 according to the present invention will be described referring to FIGS. 4 and 6. When a call comes from the PSTN to the exchange 10 (step 101), the exchange 10 pages the mobile station to which the call is to be received (step 102). This operation is carried out by transferring a paging instruction to all radio base stations through the control channel (the information of the control channel is extracted by each radio base station and also relayed to the subsequent radio base station.)

When the mobile station 20-6 responds to the page, the exchange 10 now discriminates the radio base station 30-6 as the target radio base station to which the call signal for the communication is to be transferred (step 103), and searches the database 10a in the exchange 10 to find radio base stations to be used for signal transmission path to the radio base station 30-6. As the result, radio base stations 30-3, 30-4 and 30-5 are selected as radio base station for a signal transmission path to the radio base station 30-6. Next, the exchange 10 selects a channel slot which is available in all radio base stations of 30-3 to 30-6 as a signal transfer channel slot for the radio base stations 30-3 to 30-5 and a communication channel with the mobile station 20-6 for the radio base station 30-6 (step 104).

Then, the exchange 10 sends the selected channel slot number (assuming the channel slot S8 has been selected) to all selected radio base stations 30-3 to 30-6 (step 105), and each radio base station thus instructed records this channel slot information into the memory provided in each radio base station (step 108).

In this case, as the communication is between the PSTN and the mobile station 20-6, the exchange 10 establishes a speech path from the PSTN to the nearest radio base station 30-3 (step 107), and then communication between the PSTN and the mobile station 20-6 is started (step 109).

A call signal from the PSTN is contained in the channel slot S8 of the radio signal transmitted by the radio base station 30-3. The radio base station 30-4 receives the radio signal transmitted through the radio base station 30-3 by the receiver tuned to the radio frequency of the radio base station 30-3, and then transmits its own radio signal including the call signal from the PSTN in the channel slot S8, and radio base station 30-5 carries out a similar operation. When the radio base station 30-6 has received the radio signal from the radio base station 30-5, the radio base station determines that the call signal contained in the channel slot S8 is to be used for communication with the mobile station 20-6 currently communicating in the channel slot S8 of the radio signal of the radio base station 30-6, and the call signal is extracted from the channel slot S8 in the radio signal from the radio base station 30-5.

Next, operation of communication between mobile stations (e.g., between the mobile station 20-3 and mobile station 20-6 in FIG. 5) according to the present invention will be described.

Figure 5:
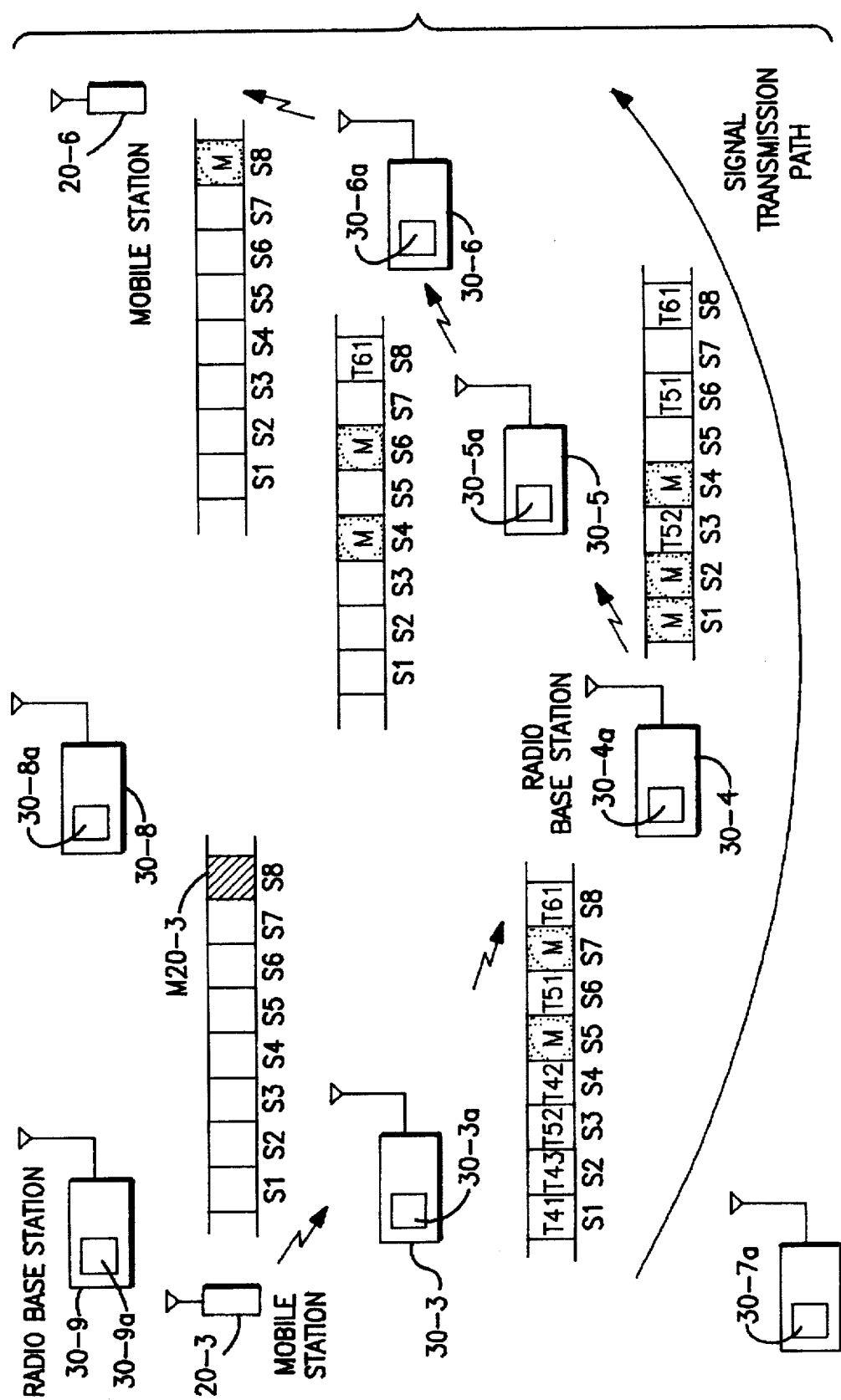
FIG. 5 is an illustration of a method for assuring a transmission path between radio base stations in case of communication between mobile stations.
Figure 6:
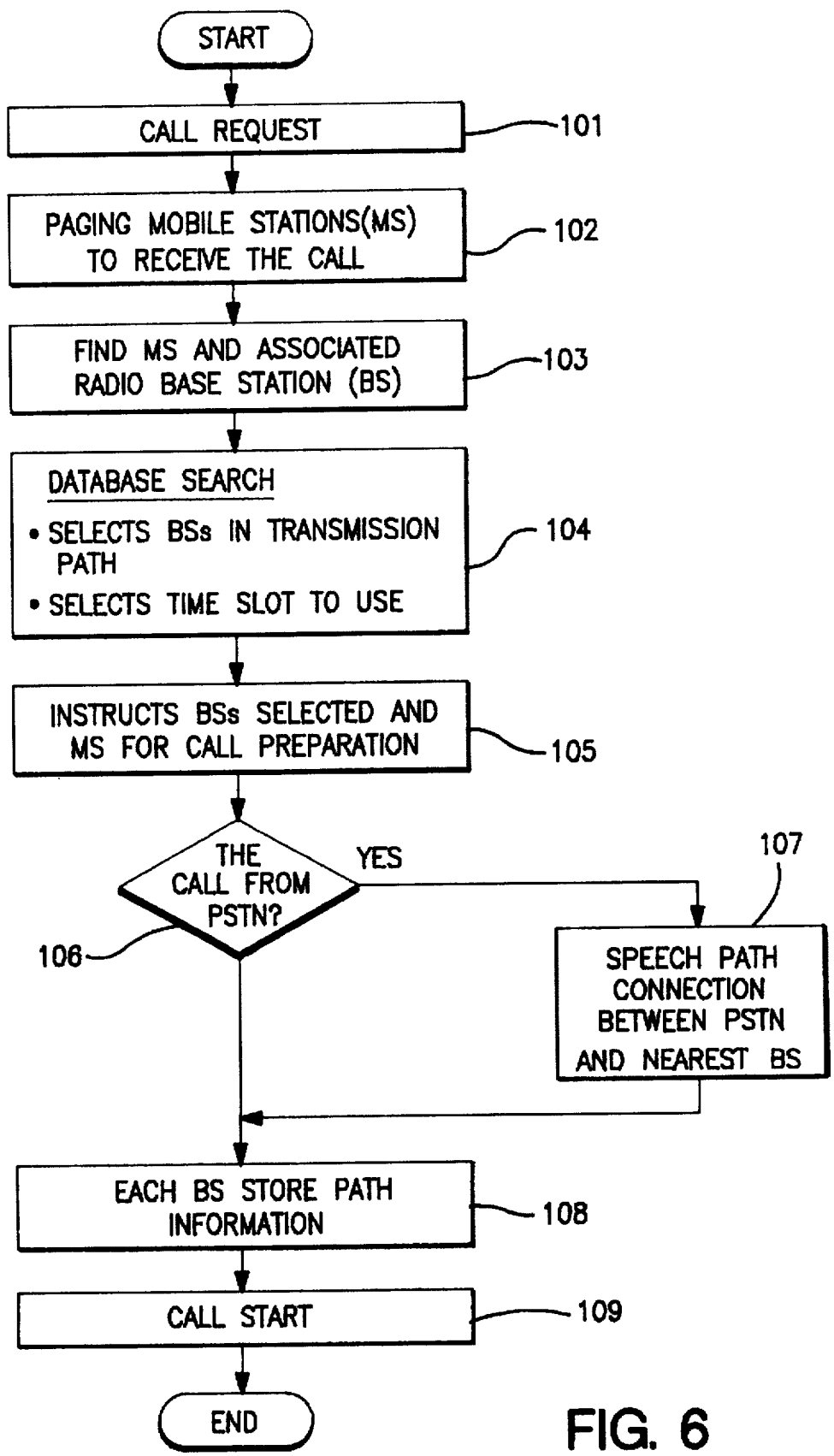
FIG. 6 is a flowchart of operation according to the present invention.

FIG. 5 shows a method for assuring the transmission path between the radio base stations in case of communication between the mobile stations 20-3 and 20-6.

When the mobile stations 20-3 requests a call to the mobile station 20-6, the request information is transferred to the exchange 10 (not shown in FIG. 5) through the radio base station 20-3 using the control channel. The paging operation and determination of target radio base station which is the radio base station 30-6 are the same as those which have already been described. And, the exchange 10 searches the database 10a to find radio base stations to be used for a signal transmission path from the radio base station 30-3 to the radio base station 30-6. As a result, radio base stations 30-4 and 30-5 are selected for a signal signal transmission path to the radio base station 30-6. Next, the exchange 10 selects a channel slot which is available in all radio base stations 30-3 to 30-6 as a signal transfer channel slot for the radio base stations 30-3 to 30-5 and a communication channel with the mobile station 20-6 for the radio base station 30-6 (step 104 in FIG. 6). Then, the exchange 10 sends the selected channel slot number (assuming the channel slot S8 has been selected,) to all selected radio base stations 30-3 to 30-6 (step 105 in FIG. 6), and each radio base station having been instructed stores this channel slot information into the memory provided in each radio base station (step 108 in FIG. 6).

In this case, as the communication is between the mobile station 20-3 and the mobile station 20-6, the exchange 10 does not establish a speech path, and then communication between the mobile station 20-3 and the mobile station 20-6 is started by using a signal transmission path between each radio base station (step 109). However, since the radio base station 30-3 is communicating with the mobile station 20-3 by using the channel slot S8, the call signal from the mobile station 20-3 is transferred to the radio base station 30-4 by using the transmitter which is tuned to the frequency used at the radio base station 30-4, and the radio base station 30-4 can also determine that information in the channel slot S8 is the call signal to be transferred because the channel slot S8 has been instructed as call signal transfer by the exchange 10. The radio base station 30-4, then, transmits the radio signal of its own frequency containing the call signal to the radio base station 30-6 in the channel slot S8. Other operations are the same as those which have already been described by referring to FIG. 4.

That is, a radio base station communicating with a mobile station located in its own radio zone uses the transmitter tuned to the frequency of the adjacent radio base station for transferring a call signal from the mobile station in its own radio zone (up-ward link signal), and other radio base stations which are only used for relaying call signals use their own frequency transmitter for transferring call signals to be relayed.

While the above description has been given using the time division multiplex transmission system as an example, similar effects can be obtained using of the frequency division multiplex transmission system and the spread spectrum multiplex transmission system.

As mentioned above, since the present invention assures a necessary transmission path by effectively using only the radio channel used for communication with the mobile station as the mobile communication system, the facilities of the conventional system for transmission between the respective radio base stations are no longer required, thereby enabling minimization of the facility cost and the operational cost required for system operation.

Although the present invention has been fully described by way of the preferred embodiments thereof with reference to the accompanying drawings, various changes and modifications will be apparent to those having skill in this field.

Therefore, unless these changes and modifications otherwise depart from the scope of the present invention, they should be construed as included therein.

What is claimed is:

1. A method of signal transmission in a mobile communication system, including a plurality of mobile stations, a plurality of radio base stations each providing a radio zone inherent thereto which communicates with the plurality of mobile stations in accordance with a multiplexing transmission system and each having at least one receiver and one transmitter operable in a radio frequency used in a adjacent radio base station, and an exchange managing mobile communication calls and controlling the mobile communication system, the method comprising steps of:

in the exchange:
  discriminating a target radio base station and a mobile station by which a call is to be received when accepting a call request from a public switched telephone network at the exchange;
  determining radio base stations to be used for a signal transmission path between the exchange and the target radio base station, and selecting a channel slot of radio signal which is available in all determined radio base stations including the target radio base station;
  instructing each of the transmission path radio base stations to store information of the selected channel slot of radio signal;
  connecting speech path between the public switched telephone network and the nearest radio base station among the selected radio base stations; and
  transferring a call signal which is contained in the selected channel slot; and in each radio base station:
monitoring channel slots of radio signal transmitted on a radio frequency of adjacent radio base station in accordance with the stored channel slot information; and
extracting and repeating transmission of the call signals in the channel slots with the radio base stations own radio frequency in the same channel slots as those of received radio signal.

2. A method of signal transmission in a mobile communication system, including a plurality of mobile stations, a plurality of radio base stations each providing a radio zone inherent thereto which communicates with the plurality of mobile stations in accordance with a multiplexing transmission system and each having at least one receiver and one transmitter operable in a radio frequency used in an adjacent radio base station, and an exchange managing mobile communication calls and controlling the mobile communication system, the method comprising steps of:

in the exchange:
  determining an originating radio base station from which a call request is originated, and a target radio base station and a mobile station by which the call is to be received;
  determining radio base stations to be used for a signal transmission path between the originating radio base station and the target radio base station, and selecting a channel slot of radio signal which is available in all determined radio base stations including the target radio base station; and
  instructing each of the transmission path radio base stations to store information of selected channel slot of radio signal;

in the originating radio base station:
transmitting a call signal transferred from the mobile station in the originating radio base station's own radio zone putting in the channel slot instructed by the exchange with a radio frequency used by the adjacent radio base station; and in each of other radio base stations:
monitoring radio signal transmitted by a radio frequency of adjacent radio base station, and also monitoring radio signal transmission on a radio frequency of own radio base station, in accordance with the stored channel slot information; and extracting and repeating transmission of the call signals in the channel slots with own radio frequency in the same channel slots as those of received radio signal.

* * * * *